US007948391B2

(12) United States Patent
Pullmann et al.

(10) Patent No.: US 7,948,391 B2
(45) Date of Patent: *May 24, 2011

(54) SIGNALING DEVICE FOR A SAFETY CIRCUIT

(75) Inventors: Jürgen Pullmann, Ebersbach (DE); Christoph Zinser, Wolfschlugen (DE); Günter Hornung, Leinfelden-Echterdingen (DE); Jürgen Fleiner, Reutlingen (DE)

(73) Assignee: Pilz GmbH & Co. KG, Ostfildern (DE)

( * ) Notice: Subject to any disclaimer, the term of this patent is extended or adjusted under 35 U.S.C. 154(b) by 25 days.

This patent is subject to a terminal disclaimer.

(21) Appl. No.: 11/581,742

(22) Filed: Oct. 16, 2006

(65) Prior Publication Data

US 2007/0090694 A1 Apr. 26, 2007

Related U.S. Application Data

(63) Continuation of application No. PCT/EP2005/003073, filed on Mar. 23, 2005.

(30) Foreign Application Priority Data

Apr. 19, 2004 (DE) ......................... 10 2004 020 995
Jun. 23, 2004 (DE) ......................... 10 2004 031 918

(51) Int. Cl.

| | |
|---|---|
| ***G08B 21/00*** | (2006.01) |
| *G08B 29/00* | (2006.01) |
| *B60Q 11/00* | (2006.01) |
| *B23K 11/24* | (2006.01) |
| *H02H 11/00* | (2006.01) |
| *H02H 5/04* | (2006.01) |
| *H01H 9/00* | (2006.01) |

(52) U.S. Cl. ........ 340/679; 340/508; 340/458; 307/112; 307/326; 361/23; 335/205

(58) Field of Classification Search .................. 340/679, 340/508; 307/112; 361/23
See application file for complete search history.

(56) References Cited

U.S. PATENT DOCUMENTS 5,880,954 A * 3/1999 Thomson et al. ............... 700/79
(Continued)

FOREIGN PATENT DOCUMENTS

DE 43 33 358 A1 4/1995
(Continued)

OTHER PUBLICATIONS

DIN EN 954-1; "Safety-related parts of control systems"; 1997; 34 pages.

*Primary Examiner* — George A Bugg
*Assistant Examiner* — Jack Wang
(74) *Attorney, Agent, or Firm* — Harness, Dickey & Pierce, P.L.C.

(57) ABSTRACT

A signaling device for a safety circuit has an input part for receiving an external state variable, at least one switching element and a control part. The control part controls the at least one switching element as a function of the external state variable, such that a signal applied to the input is communicated to the output. According to one aspect of the invention, the input of the switching element is internally connected to a fixed potential, preferably a fixed High potential. In a safety circuit for turning off a hazardous installation, such signaling devices are connected in series with one another to a safety controller. In such an arrangement, the control part of the downstream second signaling device also controls its switching elements as a function of the output of the first signaling device.

22 Claims, 5 Drawing Sheets

U.S. PATENT DOCUMENTS

| | | | | |
|---|---|---|---|---|
| 6,246,318 | B1 * | 6/2001 | Veil et al. | 340/458 |
| 6,304,178 | B1 * | 10/2001 | Hayashida | 340/545.1 |
| 6,628,015 | B2 | 9/2003 | Pullmann et al. | |
| 6,787,940 | B2 | 9/2004 | Pullmann | |
| 6,801,112 | B1 * | 10/2004 | Saxer | 335/205 |
| 6,825,579 | B2 * | 11/2004 | Ehrlich et al. | 307/113 |
| 7,130,171 | B2 | 10/2006 | Pullmann et al. | |
| 2003/0011250 | A1 * | 1/2003 | Pullmann et al. | 307/326 |
| 2003/0057069 | A1 * | 3/2003 | Ehrlich et al. | 200/52 R |
| 2003/0179074 | A1 * | 9/2003 | Palomaki et al. | 340/5.21 |
| 2004/0113491 | A1 * | 6/2004 | Mauser et al. | 307/10.2 |
| 2004/0150384 | A1 * | 8/2004 | Holle et al. | 324/110 |
| 2004/0160131 | A1 * | 8/2004 | Veil et al. | 307/116 |
| 2005/0057868 | A1 * | 3/2005 | Pullmann et al. | 361/62 |
| 2006/0077613 | A1 | 4/2006 | Hornung | |

FOREIGN PATENT DOCUMENTS

| | | | |
|---|---|---|---|
| DE | 298 06 059 | U1 | 10/1998 |
| DE | 100 16 712 | A1 | 10/2001 |
| DE | 102 16 226 | A1 | 10/2003 |
| EP | 1 363 306 | A2 | 11/2003 |
| GB | 2 282 512 | A | 4/1995 |
| WO | 2004/105067 | A1 | 12/2004 |

* cited by examiner

SIGNALING DEVICE FOR A SAFETY CIRCUIT

CROSSREFERENCES TO RELATED APPLICATIONS

This application is a continuation of international patent application PCT/EP2005/003073, filed on Mar. 23, 2005 designating the U.S., which international patent application has been published as WO 2005/101439 A1 in German language and claims priority from German patent applications DE 10 2004 020 995.2 filed on Apr. 19, 2004 and DE 10 2004 031 918.9 filed on Jun. 23, 2004. The entire contents of these priority applications are incorporated herein by reference.

BACKGROUND OF THE INVENTION

The present invention relates to signaling or sensor devices for safety circuits, and in particular to mechanically operated signaling devices such as emergency off pushbuttons, guard door switches, positional switches an the like. Moreover, the invention relates to safety arrangements using such signaling devices for safely turning off hazardous installations, such as automatically operated machines, in case of dangerous situations. In addition, the invention relates to safety circuits or safety arrangements comprising a plurality of such signaling or sensor devices.

The operating cycles of modern technical installations, such as machine tools, industrial production installations and assembly lines, transport and conveyor installations, and entertainment installations like roller coasters and the like, are increasingly controlled fully automatically. An operational controller receives setpoint and process variables for the installation and uses a prescribed control program to form control signals therefrom which operate actuators in the installation. Besides control of the intended operating cycle, safety aspects, i.e. the avoidance of risk to people who are in the area of the installation, are receiving increasing attention. By way of example, installations which perform automated movements are today normally safeguarded by safety fences, light barriers, foot mats and the like. It is also common practice to equip technical installations with emergency off pushbuttons which, when operated, are supposed to trigger a shut down of the installation (or at least part of it) or to put it into a safe state in some other way. Such safety related signaling devices, which produce and provide state signals that are relevant purely for safeguarding the installation, are typically not evaluated using the "standard" operational control of the installation, but rather are supplied to a "safety controller" or in simpler cases to a "safety switching device". For the sake of simplicity, the text below makes no further distinction between a complex safety controller and a simpler safety switching device, i.e. the term "safety controller" covers both simpler safety switching devices, as sold by the present applicant under the brand name PNOZ®, for example, and complex safety controllers, such as applicant's PLC based PSS®.

However, safety controllers differ from "standard" operational controllers because they are of an intrinsically failsafe design as a result of measures such as redundant signal processing channels, regular self-tests and the like. Although standard operational controllers might also have some fault recognition and fault avoidance measures to a certain extent, these are typically not sufficient to guarantee safe turning down of the installation under all circumstances. To distinguish from "standard" controllers and "standard" signaling devices, the present invention relates to signaling devices, safety controllers and safety circuits build which comply at least with category 3 of European Standard EN 954-1, preferably with the highest category 4, or similar safety requirements.

EP 1 363 306 A2 discloses a "safety switch", i.e. a signaling device, for monitoring the position of safety fences, safety doors, machine cladding parts and similar safety devices. Such safety switches have a control element used to determine the opening or closing position of the safety door in a failsafe fashion. To date, such safety switches are usually of electromechanical design and the required function tests and fault monitoring operations, such as cross connection identification, are performed by or at least using the superordinate safety controller. Such safety switches therefore usually obtain approval on the basis of EN 954-1 or similar standards only in combination with the safety controller.

To allow a higher safety category for the safety switch itself, EP 1 363 306 A2 proposes to integrate safety logic into the safety switch, as is already known from light barriers, light curtains and other "intelligent" signaling devices. In the exemplary embodiments described, the proposed safety switches have two mutually redundant electronic switching elements which are actuated by a failsafe control part. The switching elements have an external enable signal looped through them which is ultimately supplied to the superordinate safety controller. The enable signal can therefore be suppressed by the control part, which signals to the safety controller that the monitored installation needs to be put into a safe state. The enable signal can also be looped through a plurality of safety switches connected in series with one another, so that each of these safety switches can suppress the enable signal.

Such a series circuit comprising signaling devices has long been implemented using electromechanical signaling devices, with the enable signal in these cases being produced by the safety controller and being looped back via the individual signaling devices' relay contacts connected in series.

The safety switch design described in EP 1 363 306 A2 allows rapid reaction by the superordinate safety controller, even if a relatively large number of signaling devices are connected in series with one another to the safety controller. On the other hand, looping through the enable signal limits the maximum spatial distribution of the signaling devices connected in series. Furthermore, from the point of view of the superordinate safety controller, the entire series is "dead" if one of the signaling devices suppresses the enable signal, whether on account of a change condition in the control element (opening the safety door or the like) or on account of an internally detected fault condition. The flexibility and performance of the safety switches described therefore do not go beyond what has already been possible for a long time with corresponding relay based signaling devices.

SUMMARY OF THE INVENTION

Against this background, it is an object of the present invention to provide a signaling device which allows a more flexible use, in particular in a series arrangement of signaling devices. It is also an object of the invention to provide a signaling device which allows longer distances to implement in a series arrangement of such devices. Yet another object is to provide a safety circuit having a more flexible reaction to signaling events.

In accordance with one aspect of the invention, there is provided a signaling device for generating a safety-related command signal, comprising a device housing having a plurality of terminals including a first terminal for receiving a fixed operating voltage, the device housing accommodating an input part for receiving an external state variable representing a safety-related command, at least one switching element having an input and an output, and a control part designed to control the at least one switching element such that the input and the output are operably connected as a function of the external state variable, wherein the input of the switching element is operably coupled to the first terminal for receiving the fixed operating voltage.

According to another aspect, there is provided signaling device for a safety circuit, comprising an input part for receiving an external state variable, comprising at least one switching element having an input and an output, and comprising a control part designed to control the at least one switching element such that the input and the output are operably connected as a function of the external state variable, wherein the input of the switching element is internally connected to a fixed voltage potential.

According to yet another aspect, there is provided a safety arrangement for safely turning off a hazardous installation, comprising a safety controller designed to turn off the installation in a failsafe fashion, and a first and at least one second signaling device which are connected to the safety controller in series with one another, with the first signaling device comprising a first input part for receiving a first external state variable, at least one first switching element having a first input and a first output, and a first control part designed to control the at least one first switching element such that the first input and the first output are operably connected as a function of the first external state variable, with the second signaling device comprising a second input part for receiving a second external state variable, at least one second switching element having a second input and a second output, and a second control part designed to control the at least one second switching element such that the second input and the second output are operably connected as a function of the second external state variable, wherein the first and second inputs each are connected to a fixed voltage potential, and wherein the output of the at least one first switching element is coupled to the second control part, such that the second control part also controls the at least one second switching element as a function of the first output.

In terms of circuitry, the novel signaling device thus differs from the known safety switch of EP 1 363 306 A2 by the enable signal no longer being looped through the at least one switching element. Rather, the enable signal is now produced again and again in each signaling device. In this case, however, the control part of a downstream, second signaling device takes into account the output signal from the signaling device located upstream of it in the series circuit. It is thus a simple matter to reproduce the looping of an enable signal through a plurality of signaling devices such that it is not possible to tell any difference from the point of view of the superordinate safety controller. On the other hand, the individual signaling devices in a series arrangement are not "dead" if an upstream signaling device has suppressed the enable signal. Due to the invention, it is particularly possible that a downstream signaling device sends a data message to subsequent signaling devices and/or the superordinate safety controller which allows a more flexible reaction by the entire safety circuit. In this context, the data message can, as will be shown subsequently with reference to a preferred embodiment, be transmitted using the existing connections, i.e. the wiring complexity is low despite the increased flexibility.

Moreover, each signaling device provides a repeater function as a result of the new circuit design, and it is therefore possible to produce significantly greater distances between the signaling devices arranged in series with one another. This also allows more flexible installation planning. Group turnoff is also simple to implement on account of the novel functionality of the signaling devices, since each signaling device in the series arrangement can produce a signaling signal at its output independently of the upstream signaling devices.

In a refinement, the novel signaling device has at least one input, preferably a redundant safety input, for an external enable signal which is supplied to the control part, the control part controlling the at least one switching element as a function of the enable signal, too. In the preferred safety circuit, the enable signal is supplied to the first signaling device from the safety controller.

This refinement makes advantageous use of the new flexibility. Although the repeater function already described means that the novel signaling device has advantages over the known safety switch even without this refinement. However, only taking into account the externally supplied enable signal in the control part allows an individual reaction of the novel signaling device as a function of events occurring outside of the signaling device.

In a further refinement, the signal communicated to the output of the at least one switching element is supplied to the control part in the signaling device.

In other words, the output signal from the switching element (and hence at least indirectly the output signal of the signaling device) is fed back to the control part. The control part is therefore able to detect device-internal fault conditions. Such a feature per se is known from EP 1 363 306 A2 and has also been known for a long time from light barriers and other "intelligent" signaling devices and safety switching devices. However, the advantages of this refinement do not come into effect fully until on the basis of the present invention, since each signaling device in a series arrangement is able to forward an internal fault condition independently of the state of upstream signaling devices.

In a further refinement, the control part in the signaling device is designed to detect a device-internal fault condition and to use the at least one switching element to produce a data message at its output.

The particular advantage is that the novel signaling device is able to transmit diagnostic data via the existing signal connections to the superordinate safety controller, i.e. it is not necessary to provide for any additional connections and lines for transmitting diagnostic data. Accordingly, wiring is simplified and physical space and costs for additional connections can be saved both in the case of the signaling device and in the case of the safety controller.

In preferred refinements, the data message is a pulse message, i.e. the control part switches the at least one switching element on and off in a pulsed fashion.

In this way, messages with an information content of several bits can be transmitted very inexpensively and variably on the existing signal lines. This allows efficient forwarding of very detailed diagnostic information. This refinement also allows an address associated with the signaling device to be transmitted to the superordinate controller with little effort, which means that the safety controller can individually identify each signaling device in a series circuit.

In a further refinement, each signaling device has at least two redundant switching elements each having an input and an output, and each of the at least two redundant switching elements having the fixed potential applied to its input.

This refinement which is known per se from safety controllers has, in combination with the present invention, the advantage that the signaling device can report an internal fault condition to the superordinate safety controller on the existing signal lines, even if one of the switching elements is the cause of the fault condition. The redundancy typically provided in the known safety switching devices for safety reasons thus also results in a higher level of availability in this case.

In a further refinement, the signaling device has an input for supplying an operating voltage, the operating voltage being supplied to the at least one switching element as a fixed potential.

This refinement is particularly advantageous in respect of the novel signaling device's repeater function described above. By virtue of the at least one switching element having its input connected to the operating voltage, long distances between a plurality of the signaling devices can easily be bridged.

In a further refinement, the signaling device comprises a moveable control element which can move between a first and at least one second spatial position, the external state variable being a present spatial position. In one particularly preferred refinement, the control element is a transponder.

In this refinement, the novel signaling device preferably is a safety door switch, an emergency off pushbutton, a limit or position switch, a sensor for a foot mat or a manually operated start or command pushbutton. In this case, the control element may be integrated into the signaling device or else may be produced separately from the signaling device, as is typical for safety door switches, for example. The control element can be linked to the signaling device optically, inductively, capacitively or in any other way. This refinement is preferred because said signaling devices are relatively simple components which have to date had virtually no signal processing of their own. The enhanced scope of functions is therefore visible to a particularly great advantage in the case of these signaling devices. In addition, the use of the present invention for such "simple" signaling devices can also make the use of a superordinate safety controller superfluous for smaller applications by virtue of the signaling device activating an actuator using its outputs without any interposed safety controller.

In another refinement, it is therefore preferred if the novel signaling device has a feedback input for supplying an external feedback signal from an actuator.

The signaling device in this refinement therefore combines the previously separate functions of "record state variable" (sensor) and "turn off installation" (signal processing). Small safety related applications can therefore be implemented very inexpensively.

In another refinement, the input part is designed to pick up a physical measured variable, particularly a rotational speed, a voltage and/or a current, as external state variable.

Sensors for receiving such state variables are usually installed in a control cabinet, while emergency off pushbuttons, limit or position switches, safety door switches and similar signaling devices are usually installed at the installation. The aforementioned advantages can also be transferred in the same way to such measuring sensors as signaling devices, however. By way of example, a plurality of rotational speed monitors can be connected in series in the manner described here, so that a plurality of moving shafts can inexpensively be monitored.

It goes without saying that the aforementioned features and those yet to be explained below can be used not only in the respective indicated combination but also in other combinations or on their own without departing from the scope of the present invention.

BRIEF DESCRIPTION OF THE DRAWINGS

Exemplary embodiments of the invention are shown in the drawing and are explained in more detail in the description below. In the drawing.

DESCRIPTION OF PREFERRED EMBODIMENTS

Figure 1:
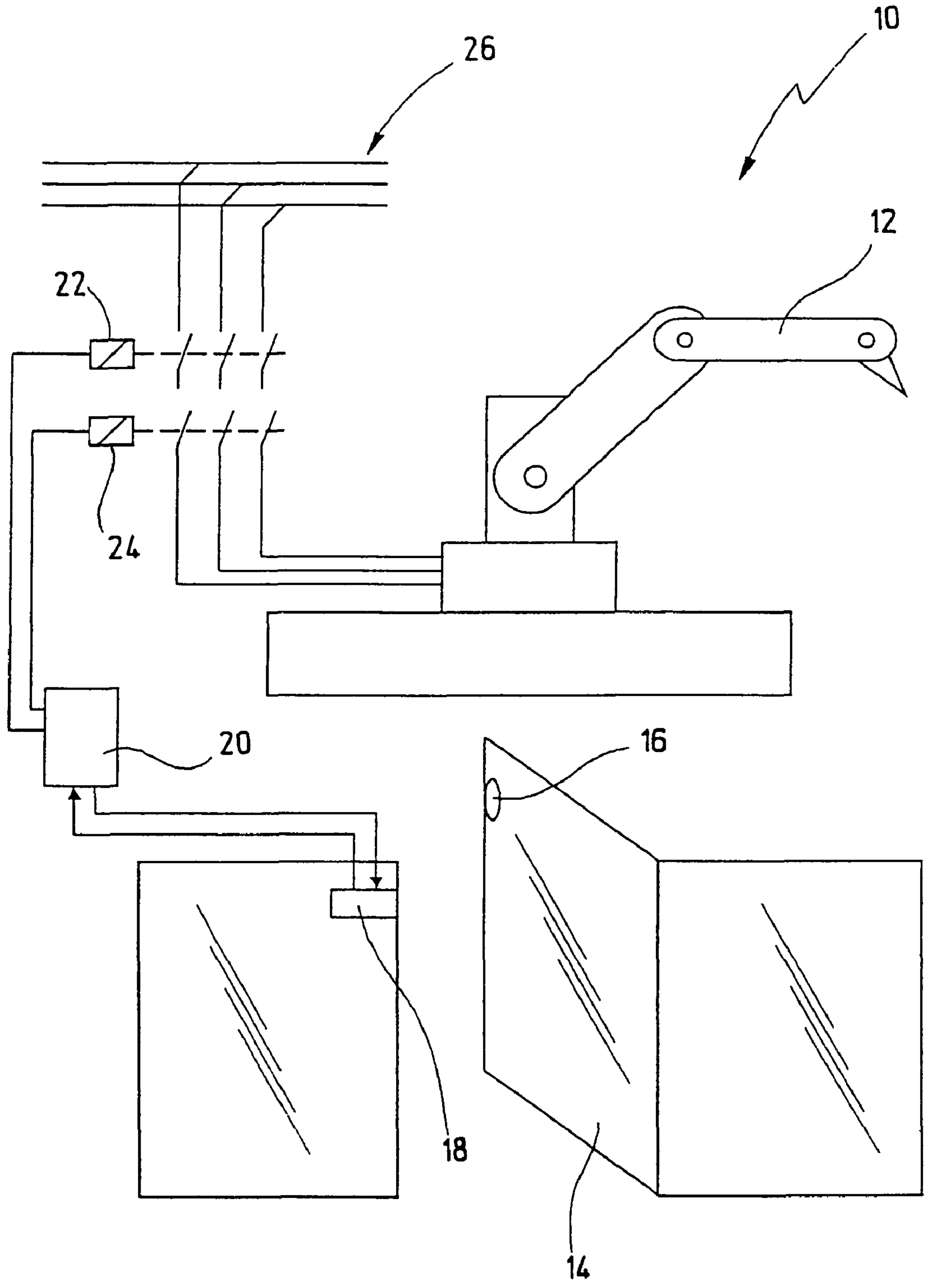
FIG. 1 shows a simplified illustration of an installation in which a signaling device based on the present invention is used for protection.

In FIG. 1, an installation safeguarded by using the invention is denoted in its entirety by reference numeral 10.

In this arrangement, the installation 10 comprises a robot 12 whose automated movements would be hazardous to a person (not shown here) in the area of movement of the robot 12. The area of movement of the robot 12 is therefore safeguarded by means of a safety door 14 and safety fences, as is known per se. The safety door 14 has a control element 16 mounted on it. On a stationary frame against which the safety door 14 bears when closed there is a safety switch 18, i.e. more generally the stationary part of a signaling device based on the present invention. The safety switch 18 is connected to a safety controller 20 via a plurality of lines. The output of the safety controller 20 controls two contactors 22, 24 whose contacts can interrupt the power supply 26 to the robot 12.

The installation 10 is shown here in simplified form. As the people skilled in the art know, the safety door 14 is usually equipped with at least two safety switches 18 and appropriate control elements 16, one of the safety switches frequently being arranged in concealed form in order to make manipulation more difficult. In addition, an installation of this kind often contains further signaling devices, such as emergency off pushbuttons or further safety door switches (not shown here). Furthermore, the standard operational controller for the robot 12 has not been shown here for the sake of simplicity. In order to allow restricted operation when the safety door is open, one or more rotational speed monitors (not shown here) can be connected to the drives and/or to the moving shafts of the robot.

In a simple scenario, the safety controller 20 may be a safety switching device, as sold by the applicant under the brand name PNOZ®. If numerous safety-related signaling devices are required in order to safeguard the installation 10, however, it is advantageous to use a more complex safety controller, such as the safety controllers sold by the applicant under the brand name PSS®. At least in the latter case, the safety controller 20 usually has a field bus connection and further interfaces for communicating with the standard operational controller (not shown here) and/or for communicating with a superordinate master computer.

Figure 2:
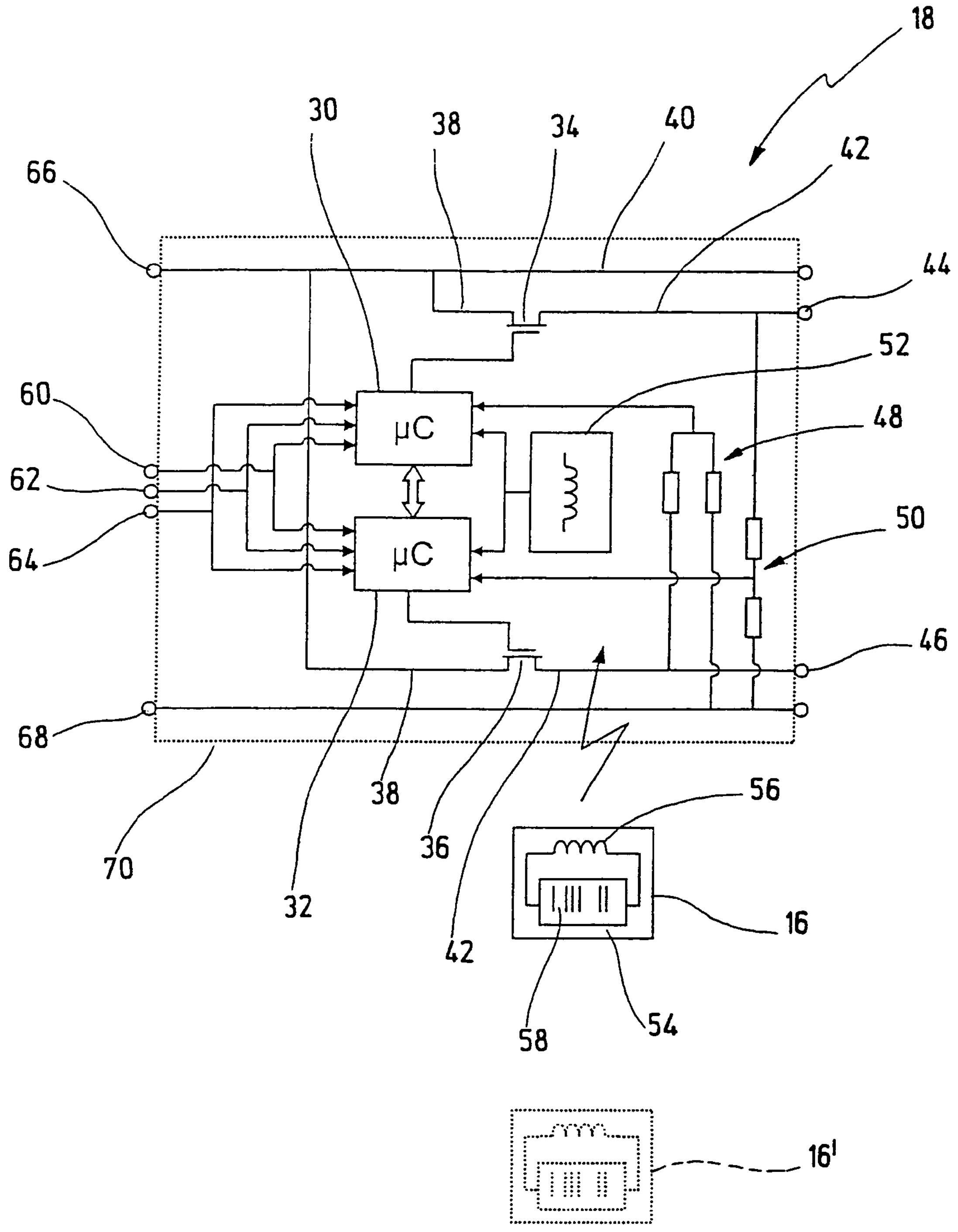
FIG. 2 shows a schematic illustration of an exemplary embodiment of the novel signaling device.

In the preferred exemplary embodiment shown in FIG. 2, the safety switch 18 is of a two channel redundant design. Accordingly, the safety switch 18 in this case has two redundant microcontrollers 30, 32 which monitor one another, as shown by a double headed arrow between the microcontrollers. In preferred exemplary embodiments, the microcontrollers are different, i.e. the safety switch 18 is of diversitary design.

The reference numerals 34, 36 denote two electronic switching elements, which in this case are shown as field effect transistors. Alternatively, however, it is also possible to use bipolar transistors or other, preferably electronic, switching elements.

The control connection (gate) of the switching element 34 is connected to the microcontroller 30. The input 38 (source) is connected to a line 40 which has an operating voltage $U_B$ applied to it during operation of the safety switch 18. The output 42 (drain) is connected to a connection 44 on which the safety switch 18 can be wired externally. As a result, the output 42 of the switching element 34 forms an output signal of the safety switch 18.

The second switching element 36 has its control connection (gate) connected to the microcontroller 32. Its input 38 is likewise at operating voltage $U_B$ via the line 40. Its output 42 is supplied to a second output connection 46 of the safety switch 18.

The signals at the outputs 42 of the switching elements 34, 36 are fed back to the microcontrollers 30, 32 via two voltage dividers 48, 50. This means that the microcontrollers 30, 32 can monitor the respective switching state of switching elements 34, 36.

The reference numeral 52 denotes an input part which the microcontrollers 30, 32 use to determine the present state of the control element 16, that is its spatial position in this case. In the preferred embodiment shown here, the control element 16 is a transponder having a signal generation circuit 54 and a transmission and reception coil 56. The signal generation circuit 54 stores an individual code 58. The input part 52 has a transmission and reception coil (shown only symbolically here) which it uses to transmit a request signal. As soon as the transponder 16 is in the vicinity of the input part 52 (safety door closed), the signal generation circuit 54 in the control element 16 is activated. The control element 16 then returns the stored code 58 to the input part 52. There, the code 58 is demodulated from the received signal and is made available to the microcontrollers 30, 32.

If the safety door 14 is open, on the other hand, the control element 16 is outside of the transmission and reception range of the input part 52, which is shown at position 16' in FIG. 2. In this case, no communication takes place between the control element 16 and the input part 52. The microcontrollers 30, 32 therefore do not receive a code, which is interpreted as the safety door 14 being open. If a second safety door switch or at least a second control element (not shown) is present then it is also possible to identify a fault condition in the control element 16 or in the input part 52.

In other embodiments, the input part 52 may be designed for other types of control elements. In this case, the control element may also be integrated in the safety switch 18. By way of example, the safety switch 18 could be an emergency off pushbutton, and the control element in this case would be the striker of the pushbutton. In other embodiments, the input part 52 comprises inductive, capacitive, optical or other sensors for determining a present position for a mechanically moveable control element. Furthermore, the invention may basically also be applied for light barriers and other signaling devices which vary between at least two states. In other exemplary embodiments, the input part is designed to pick up a physical state variable by measurement, as explained in more detail further below with reference to FIG. 5.

The input of the safety switch 18 in this case has three connections 60, 62, 64 which are respectively in the form of safety inputs and are redundantly connected to the two microcontrollers 30, 32. The connections 60 to 64 can be used for redundantly supplying external enable signals to the microcontrollers 30, 32. In addition, a connection 66 for supplying an operating voltage $U_B$ and a ground connection 68 are provided in a manner which is known per se. It goes without saying that said connections are respectively accessible on the outside of a housing 70 of the safety switch 18.

Figure 3:
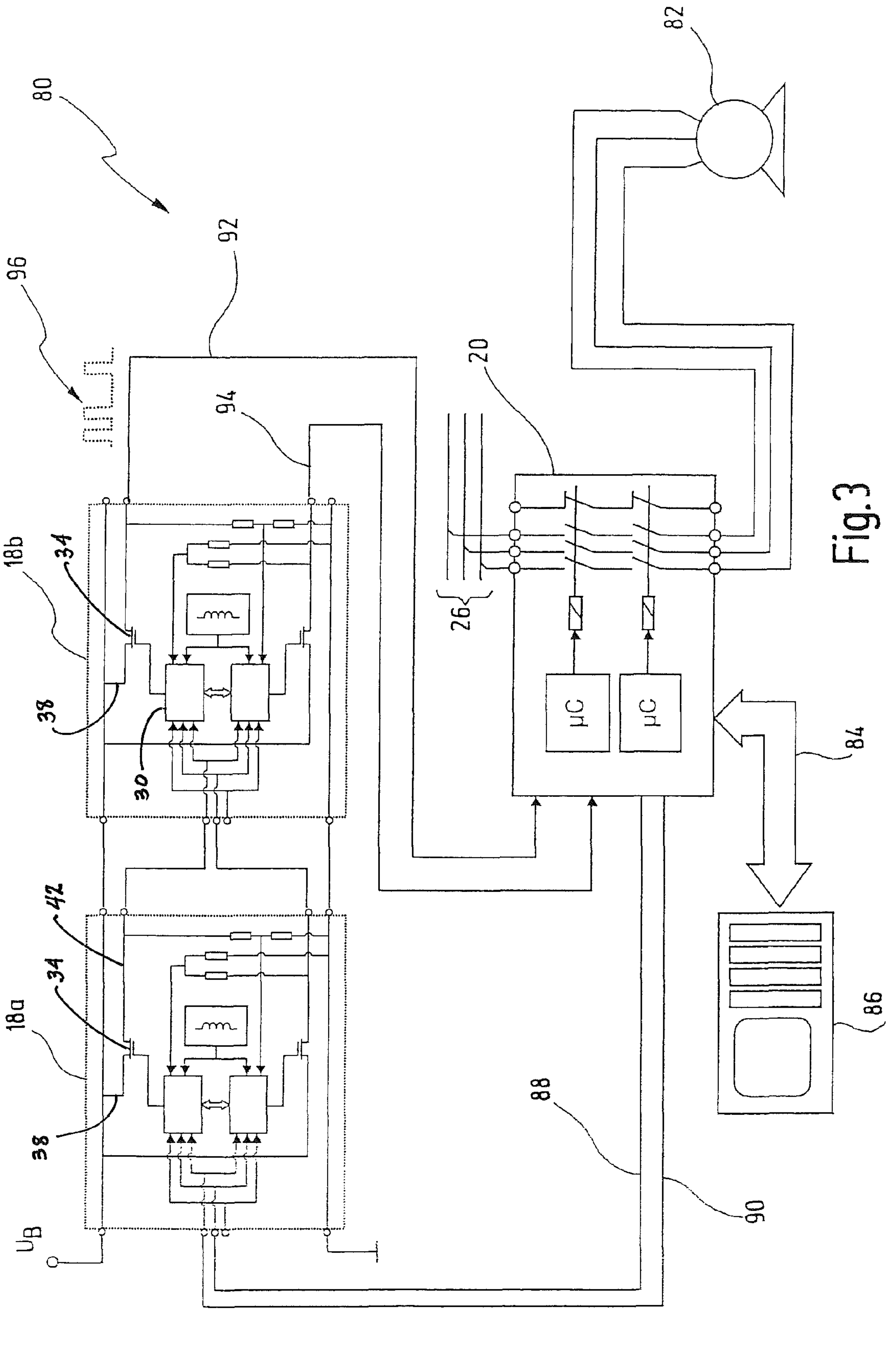
FIG. 3 shows a safety circuit having two signaling devices of the type shown in FIG. 2 in a series arrangement.

In FIG. 3, a safety circuit having two of the safety switches 18 described is denoted in its entirety by the reference numeral 80. Otherwise, identical reference symbols denote the same elements as previously. The two safety switches are denoted by 18*a* and 18*b* in order to distinguish them from one another.

The safety switch 18*a* has its terminals 60, 62 connected to outputs of the safety controller 20. Preferably, these are "clock outputs" of the safety controller 20 which produce two clock signals of different frequency and/or phase, so that cross connection identification is possible both in the safety switch 18*a* and (through feedback, not shown here) in the safety controller 20. In addition, the safety switch 18*a* has the terminals 66, 68 connected to operating voltage $U_B$ or ground. On the output side, the terminals 44, 46 of the safety switch 18*a* area routed to the terminals 60, 62 of the downstream safety switch 18*b*. The two safety switches 18*a*, 18*b* are therefore arranged in series with one another. In the arrangement shown, the safety switch 18*b* receives operating voltage from the safety switch 18*a*. Alternatively, the safety switch 18*b* could be connected to a separate source for the operating voltage $U_B$.

The two output signals from the safety switch 18*b*, i.e. the signals which are present on its terminals 44, 46, are supplied to safety inputs of the safety controller 20. The output of the safety controller 20 is connected between the power supply 26 and a drive 82 which is to be turned off, for example a servo drive in the robot 12. In addition, it is shown schematically here that the safety controller 20 is connected via a field bus 84 to an operational controller 86 for the robot 12 and/or to a superordinate master computer. The control elements belonging to the safety switches 18*a*, 18*b* are not shown in FIG. 3 for reasons of clarity.

The safety circuit 80 operates as follows: Following startup, the safety controller 20 produces two clock signals 88, 90 on its outputs and supplies them to the safety switch 18*a* as enable signals. The microcontrollers 30, 32 in the safety switch 18*a* use the input part 52 to monitor the present state of the associated control element. If the control element is in the vicinity of the input part 52 and if the enable signals 88, 90 are received soundly, the microcontrollers 30, 32 use the switching elements 34, 36 to produce two output signals which are a reproduction of the enable signals 88, 90. They could also differ from the clock signals 88, 90, however, for example in terms of their frequency. The second safety switch 18*b* receives the reproduced enable signals and reproduces them for its part at the output if it likewise establishes that the safety door is closed and operation is sound. The safety controller 20 receives the reproduced enable signals via lines 92, 94.

If the safety switch 18*a* now detects that its associated safety door is open, i.e. if the associated control element changes its state, the microcontrollers 30, 32 open the switching elements 34, 36. The downstream safety switch 18*b* consequently no longer receives the reproduced enable signals. This is identified by the microcontrollers in the safety switch 18*b* and is reported to the safety controller 20 by virtue of the switching elements 34, 36 being turned off. The safety controller 20 can then turn off the drive 82.

The flow of signals takes place in the same way when the safety switch 18*a* detects an fault condition, for example a cross connection on the input or output connections, failure of one of the switching elements 34, 36 or any other fault condition. After a brief waiting time which is stored in the microcontrollers of all the safety switches 18*a*, 18*b* and the safety controller 20, the safety switch 18_a_ produces a data message 96 on at least one of its output lines by closing and reopening at least one of the switching elements 34, 36 in pulsed fashion. The downstream safety switch 18_b_ receives this data message and forwards it to the safety controller 20 in the same way. If required, it can also incorporate further information into the data message 96.

In one embodiment, the data message 96 is produced as in the case of an asynchronous, serial interface, i.e. it starts with a defined start bit and ends with a defined stop bit. In between there is an arbitrary or predefined number of data bits. In another embodiment, each data message 96 contains a predefined number of pulses with a defined pulse duration. The significance of each individual pulse is dependent on the protocol stipulated between the safety switches 18 and the safety controller 20.

In the same way the safety switch 18_b_ produces a separate data message 96 if it itself finds an fault condition. In contrast to the known arrangement, the safety switch 18_b_ is able to produce its data messages independently of whether the safety switch 18_a_ is opened or closed to the switching elements 34, 36.

In one preferred embodiment, the data messages from the safety switches 18_a_, 18_b_ contain an address information item which identifies that safety switch which wishes to report information to the superordinate safety controller 20. The respective address can be allocated to the safety switches 18_a_, 18_b_ in various ways. By way of example, each safety switch 18_a_, 18_b_ may be provided with a multistage address selector switch (not shown here) on which the associated address is set. In another exemplary embodiment, the safety switches 18_a_, 18_b_ respectively use the code 58 of their associated control element 16 as address.

In another embodiment, the series connected safety switches 18_a_, 18_b_ are allocated an address in an initialization mode following startup of the safety circuit 80. A preferred method of performing this address allocation is shown with reference to FIG. 4.

Figure 4:
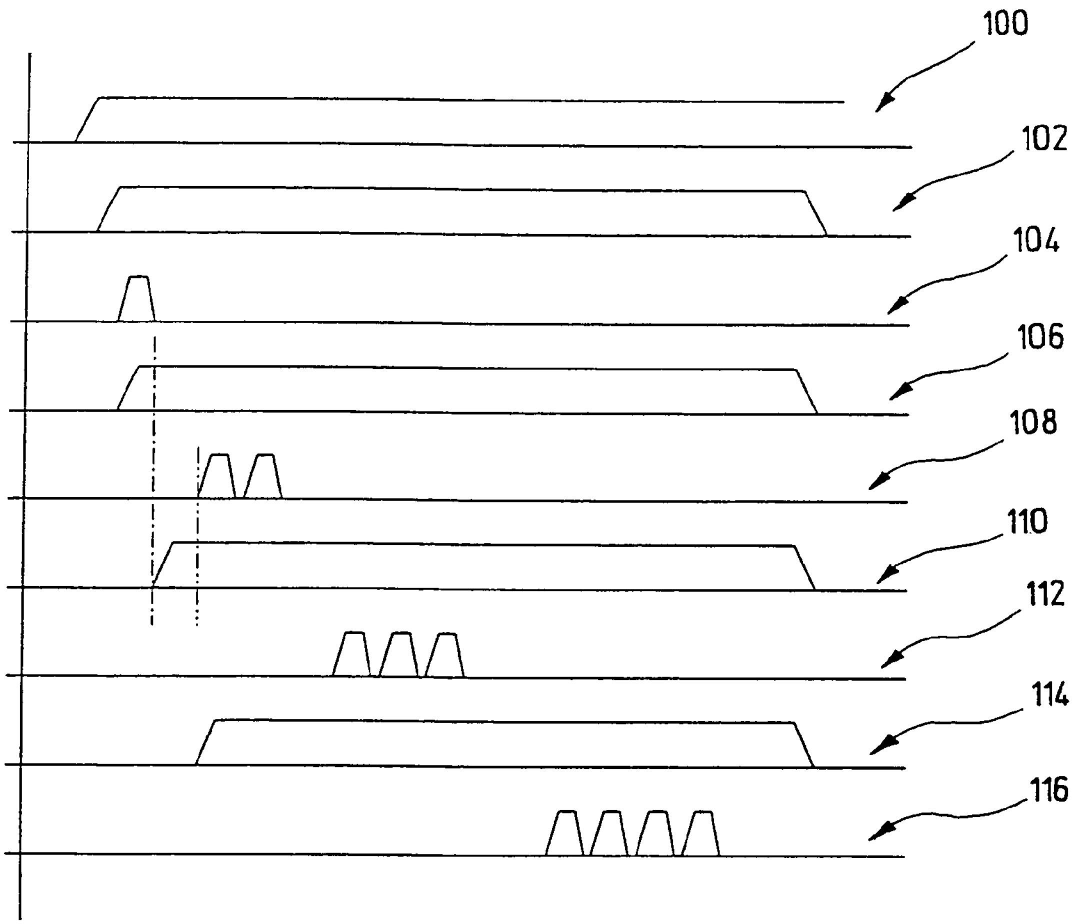
FIG. 4 shows a timing diagram with signal profiles for the initialization of a safety circuit as shown in FIG. 3.

FIG. 4 shows the signal diagrams for this initialization mode. The top pulse train 100 is the operating voltage $U_B$ being turned on for all the components of the safety circuit 80. Reference numeral 102 shows the signal at the first clock output of the safety controller 20, i.e. the signal on the line 88. Reference numeral 104 shows the signal at the second clock output of the safety controller 20, i.e. the signal on line 90. When the operating voltage $U_B$ has been turned on, the first safety switch 18 receives a permanent High at its input 60 and a single pulse at its input 62. As soon as it identifies the latter, it reproduces the signal applied to its connection 60 (permanent High) at its output 44 (reference numeral 106). After a waiting time T, its output 46 then produces two pulses, as shown by reference numeral 108. The waiting time T is used to identify whether further pulses are received at the input.

The second safety switching device 18_b_ receives the signals 106, 108 at its inputs 60, 62 and reproduces them at its outputs 44, 46. In so doing, it adds a further single pulse to the single pulses 108 which it receives at the connection 62. The outputs of the second safety switch 18_b_ therefore produce the pulse trains which are shown by reference numerals 110, 112. In the same way, further safety switching devices 18_c_, 18_d_ etc. (not shown in FIG. 3) would reproduce a permanent High on one signal line (reference numeral 114) and a pulse train on the second signal line, and each safety switch would increase the pulse train by one pulse.

At the end of the chain, the safety controller 20 receives the signals shown by reference numerals 114, 116. From the signal 114, the safety controller 20 identifies that the wiring of channel A is correct. From the pulse train 116, the safety controller 20 identifies that the wiring of channel B is correct. In addition, it can determine the number of safety switches 18_a_, 18_b_ etc. arranged in series from the number of pulses (minus 1). In the same way, each safety switch 18_a_, 18_b_ can identify its address from the number of pulses received. In this way, an individual address can be automatically allocated to each safety switch arranged in series when the safety circuit 80 is turned on. If the safety circuit 80 is later altered, there follows fresh and correct address allocation to the configuration which then exists automatically when turning on again.

The flexibility of the novel signaling devices is increased even further here by the input terminal 64, which has not been explained up to now. This terminal can be used to feed an external feedback signal into the safety switch 18. This means, by way of example, that the safety switch 18 can by itself actuate a contactor having positively-guided contacts, i.e. without a safety switching device or an appropriate safety controller used so far for this purpose. It is sufficient if the positively-guided break contact of the contactor is routed to the feedback input 64 of the safety switch 18.

In other embodiments, signaling devices such as the safety switch 18 shown have a further input terminals for applying a start signal. This even allows to implement monitored restarting of the installation without the previously usual safety controller.

In addition, operational modes of the signaling devices 18 can be set via the input terminal 64, as is described in DE 100 16 712 A1, for example. Furthermore, parameters can be set externally using different transponder codes.

Figure 5:
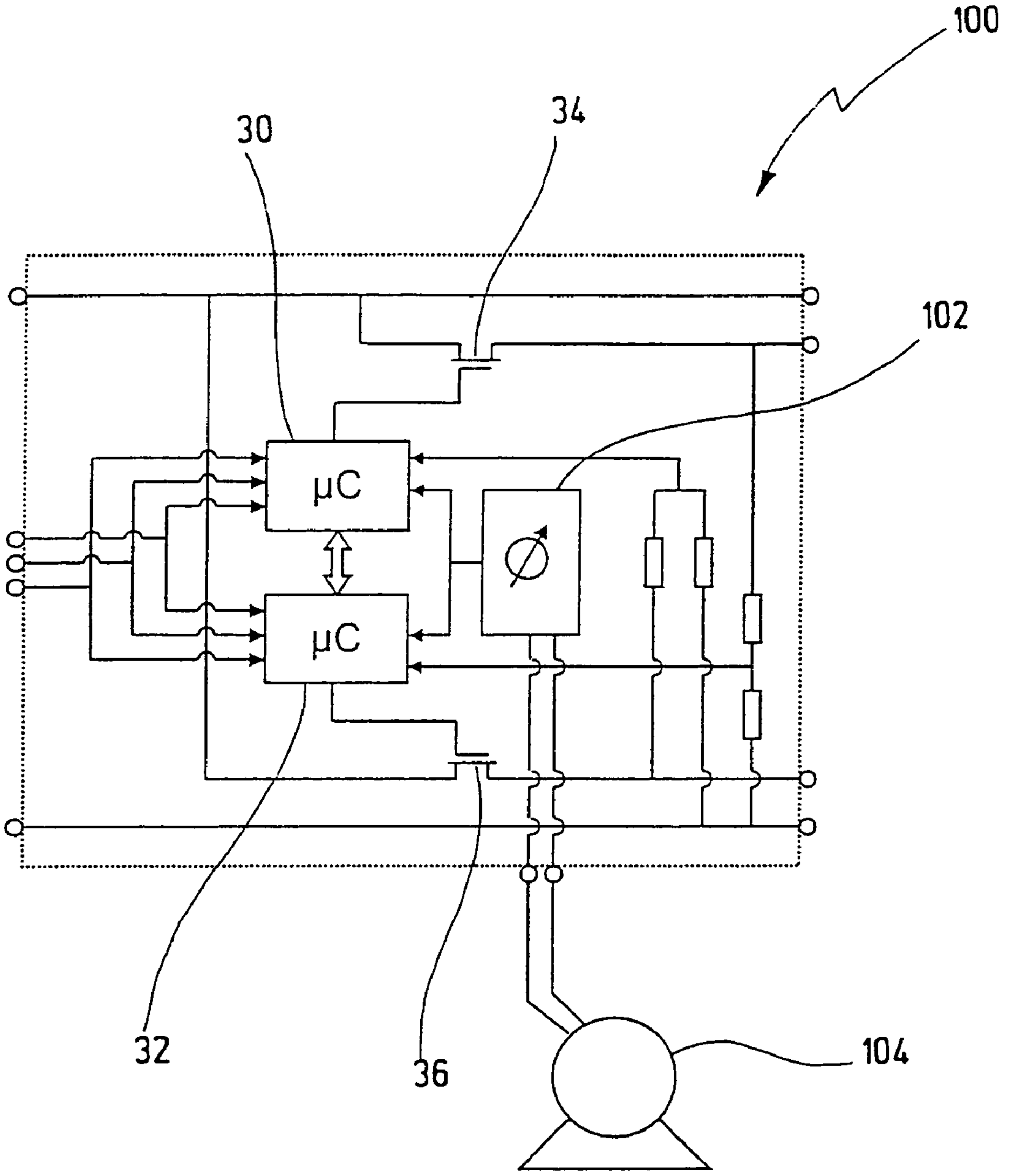
FIG. 5 shows a further exemplary embodiment of a novel signaling device.

FIG. 5 shows an exemplary embodiment of a novel signaling device 100 as a rotational speed monitor. In this figure, identical reference symbols denote the same elements as before.

The signaling device 100 differs from the signaling device 18 from FIG. 2 essentially in terms of the input part 102, which in this case is designed for recording a rotational speed by measurement, unlike the input part 52. In this exemplary embodiment, the rotational speed recording is performed without a sensor by virtue of the input part 102 tapping off the motor voltages from a rotary drive 104 and evaluating them in terms of their frequency. In one particular embodiment, the signaling device 100 is in the form of a zero speed monitor, i.e. it monitors when a rotational speed of zero is reached and held. This can be done by virtue of the input part 102 tapping off and monitoring the generator voltages produced by the decelerating rotary drive 104, as is known per se from zero speed monitors for safety related applications.

In other exemplary embodiments, the input part 102 records a voltage, a current or another physical variable by measurement, and the microcontrollers control the switching elements 34, 36 on the basis of the recorded variable, particularly on the basis of the recorded variable adopting a prescribed setpoint value.

What is claimed is:

1. A safety switching device for use in a safety circuit having a safety controller configured to interrupt the supply of power to an installation in a failsafe manner in response to receipt of an output signal from the safety switching device, the safety switching device comprising:

a device housing having a plurality of terminals accessible on the outside of said housing including a first input terminal for receiving a fixed operating voltage and first and second output terminals for redundantly producing said output signal, the device housing accommodating:

an input part for monitoring a current state of an actuator or a signaling device having at least two different states and for generating a first signal in response to a change in the current state of the actuator or signaling device, first and second switching elements each having an input and an output, wherein the outputs of the first and second switching elements are connected respectively to said first and second output terminals, and a control part connected to the input part and the first and second switching elements for controlling said first and second switching elements to redundantly generate said output signal in response to said first signal from said input part;

wherein the input of each of said first and second switching elements is connected internally within the device housing to said first input terminal for receiving the fixed operating voltage; and further wherein said safety switching device further comprises a third output terminal connected internally within said device housing directly to said first input terminal for supplying said fixed operating voltage in an unswitched manner directly to said third output terminal.

2. The safety switching device of claim 1, wherein the plurality of terminals include a second input terminal for receiving an external enable signal, with the external enable signal being supplied to the control part, and the control part also controlling the first and second switching elements as a function of the enable signal.

3. The safety switching device of claim 2, wherein the second input terminal includes two second input terminals for redundantly receiving the enable signal.

4. The safety switching device of claim 1, wherein the outputs of the first and second switching elements are also operably coupled to the control part.

5. The safety switching device of claim 1, wherein the control part is designed to detect a device-internal fault condition and to control the first and second switching elements for redundantly producing a data message at the outputs of said first and second switching elements.

6. The safety switching device of claim 5, wherein the data message is a pulsed data message.

7. A safety switching device for use in a safety circuit having a safety controller configured to interrupt the supply of power to an installation in a failsafe manner in response to receipt of an output signal from the safety switching device, the safety switching device comprising:

a device housing having a plurality of terminals accessible on the outside of said housing including a first input terminal for receiving a fixed operating voltage and a first output terminal for producing said output signal, the device housing accommodating:

an input part for monitoring a current state of an actuator or a signaling device having at least two different states and for generating a first signal in response to a change in the current state of the actuator or signaling device, at least one switching element having an input and an output connected to said first output terminal, and a control part connected to the input part and the at least one switching element for controlling said at least one switching element to generate said output signal in response to said first signal from said input part;

wherein the input of said at least one switching element is connected internally within the device housing to said first input terminal for receiving the fixed operating voltage; and further wherein said safety switching device further comprises a second output terminal connected internally within said device housing directly to said first input terminal for supplying said fixed operating voltage in an unswitched manner directly to said second output terminal.

8. The safety switching device of claim 7, wherein the at least one switching element comprises at least two redundant switching elements each having an input and an output, with each of the inputs being operably coupled internally within the device housing to the first input terminal to receive the fixed operating voltage.

9. The safety switching device of claim 7, wherein the actuator or signaling device further comprising a moveable control element configured to move between a first and at least one second position.

10. The safety switching device of claim 9, wherein the input part comprises a transponder reader circuit and the moveable control element is a transponder.

11. The safety switching device of claim 7, wherein the input part is designed to pick up to measure an analog state variable.

12. The safety switching device of claim 11, wherein the analog state variable comprises at least one of a rotational speed, a variable voltage and a variable current.

13. The safety switching device of claim 7, wherein the plurality of terminals includes an additional terminal configured as a feedback input for supplying a feedback signal from an external actuator.

14. A safety arrangement for safely turning off a hazardous installation, comprising:

a safety controller designed to turn off the installation in a failsafe fashion, and a first and a second safety switching device connected to the safety controller in series with one another, with the first safety switching device comprising a first input part for monitoring a current state of a first actuator or signaling device having at least two different states and for generating a first signal in response to a change in the current state of the first actuator or signaling device, a first pair of switching elements each having a first input and a first output, and a first control part connected to the first input part and to each of said first pair of switching elements to control both of said first pair of switching elements such that the first input and the first output of each of said first pair of switching elements are operably connected in redundant fashion as a function of the first signal, with the second safety switching device comprising a second input part for monitoring a current state of a second actuator or signaling device having at least two different states and for generating a second signal in response to a change in the current state of the second actuator or signaling device, a second switching element having a second input and a second output, and a second control part connected to the second input part and the second switching element to control the second switching element such that the second input and the second output are operably connected as a function of the second signal, wherein the first inputs of each of said first pair of switching elements and the second input of the second switching element are each connected in an unswitched manner directly to a fixed supply voltage potential, and wherein the redundant first outputs of the first pair of switching elements are coupled to the second control part, such that the second control part also controls the second switching element as a function of the redundant first outputs.

15. The arrangement of claim 14, wherein the first safety switching device comprises a housing having a first input terminal, said housing accommodating said first input part, said first pair of switching elements and said first control part, wherein said first control part is connected internally to the first input terminal, and said first input terminal is connected externally to the safety controller for supplying an enable signal from the safety controller to the first control part, wherein the first control part also controls the first pair of switching elements as a function of the enable signal.

16. The arrangement of claim 14, wherein the first and second control parts each are designed to detect a device-internal fault condition and to generate a pulsed data message at the first output and second output, respectively, as a function of such fault conditions.

17. The arrangement of claim 14, wherein the second control part is able to control the second switching element to generate at said second output a pulsed data message signal even when one or both of the first pair of switching elements is/are inoperative.

18. The arrangement of claim 14, wherein said first safety switching device further comprises a first device housing accommodating said first input part, said first pair of switching elements and said first control part, wherein said first input of each of said first pair of switching elements is connected internally within said first device housing to a first input terminal that is connected externally to said fixed operating voltage, and further wherein said first safety switching device further comprises a first output terminal connected internally within said first device housing to said first input terminal for supplying said fixed operating voltage directly to said first output terminal.

19. The arrangement of claim 18, wherein said first safety switching device further comprises second and third output terminals connected internally within said first device housing respectively to said first outputs of said first pair of switching elements.

20. The arrangement of claim 19, wherein said second safety switching device further comprises a second device housing accommodating said second input part, said second switching element and said second control part, wherein said second input of said second switching element is connected internally within said second device housing to a second input terminal that is connected externally to said first output terminal of said first switching device for supplying said fixed operating voltage directly to said second input terminal.

21. The arrangement of claim 20, wherein said second safety switching device further comprises third and fourth input terminals connected internally within said second device housing to said second control part and externally respectively to said second and third output terminals of said first safety switching device.

22. The arrangement of claim 15, wherein the first control part is configured to further control said first pair of switching elements to reproduce said enable signal at said redundant first outputs so that said enable signal from said safety controller is passed on to the second control part of the second safety switching device.

* * * * *